(12) United States Patent
Ratcliff

(10) Patent No.: US 6,405,442 B1
(45) Date of Patent: Jun. 18, 2002

(54) GOLF SHOT RANGE FINDER

(76) Inventor: William R. Ratcliff, 2626 E. 72nd St., Tulsa, OK (US) 74119

( * ) Notice: Subject to any disclaimer, the term of this patent is extended or adjusted under 35 U.S.C. 154(b) by 0 days.

(21) Appl. No.: 09/478,568

(22) Filed: Jan. 6, 2000

(51) Int. Cl.[7] .............................................. G01C 3/02
(52) U.S. Cl. ........................ 33/1 SD; 33/277; 33/227; 473/407; D10/70
(58) Field of Search .............................. 33/1 SB, 1 SD, 33/274, 276, 277, 227, 228, 284, 289, 494, 700, 701, 506, 508, 679.1; 473/407; 116/222, 225; D10/70

(56) References Cited

U.S. PATENT DOCUMENTS

| | | | |
|---|---|---|---|
| 2,164,463 A | 7/1939 | Mather | 33/277 |
| 2,519,727 A | 7/1947 | Yezdan | 33/277 |
| D193,634 S | 9/1962 | Chambers | D10/70 |
| D194,040 S | 11/1962 | Schroeder | D10/70 |
| D203,604 S | 2/1966 | Lo Jacono | D10/70 |
| 3,409,987 A | 11/1968 | New | 33/277 |
| D233,452 S | 10/1974 | Mayson | D10/70 |
| 3,907,288 A | 9/1975 | Hudak | 33/277 |
| 4,063,731 A | 12/1977 | Kitay | 33/262 |
| D305,307 S | 1/1990 | Sanders | D10/70 |
| 5,211,395 A | 5/1993 | Liao | 473/407 |
| 5,776,015 A | 7/1998 | Bernhardt | 473/407 |

*Primary Examiner*—Christopher W. Fulton
(74) *Attorney, Agent, or Firm*—Frank J. Catalano

(57) ABSTRACT

For assisting a golfer to determine the yardage from a golf ball to a target golf hole and to select the proper base club for the golf shot, a flat card has an elongated aperture with its top edge spaced from its bottom edge at parallel intervals taken across the aperture by distances decreasing in length from one end of the aperture to the other. The front and back faces of the card have first and second pluralities of the parallel intervals marked along the edges of the aperture respectively. The distances across the aperture at the marked intervals are nomographically coordinated to intervals of distance from the golf ball to the pin placed in the target golf hole. The distance from the golf ball to the pin is thus determinable by coincidental alignment of one of the marked intervals with the pin when the pin is visually registered in the aperture by the golfer. The front and rear face marked intervals nomographically correspond to different pin lengths, so as to accommodate a greater number of golf courses. To facilitate reading the marked yardages, plates mounted in sliding juxtaposition on faces of the card have scales corresponding to the marked yardage intervals on the faces. The plate scales indicate club selections. The plates are positionable on the card to directly correlate the distances shown to the base club selection personally appropriate to the particular golfer.

18 Claims, 4 Drawing Sheets

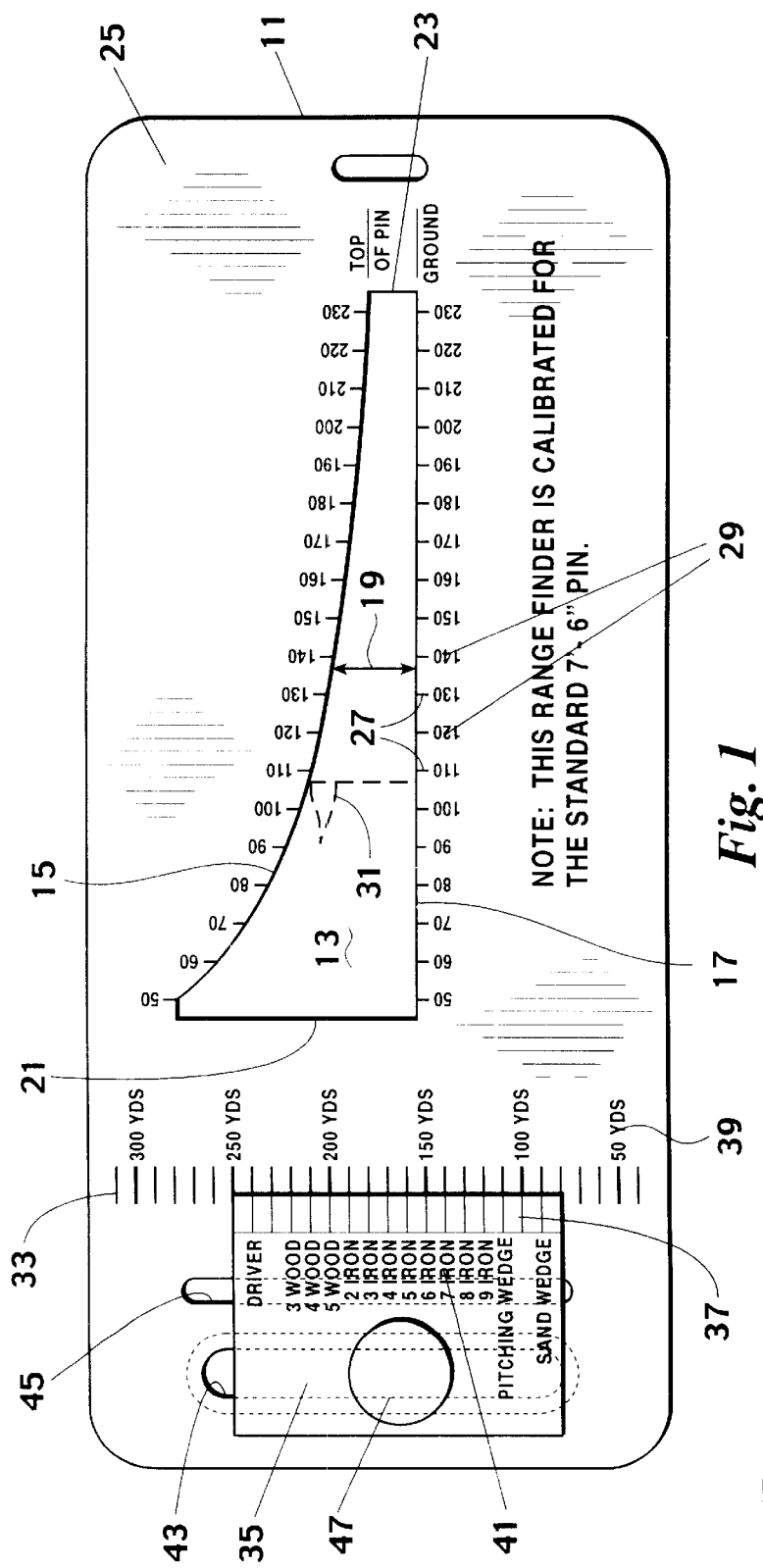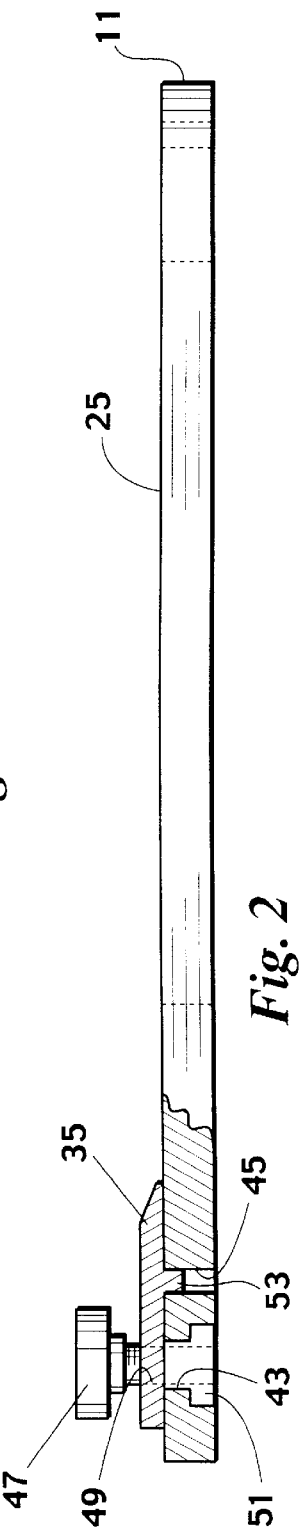

GOLF SHOT RANGE FINDER

BACKGROUND OF THE INVENTION

This invention relates generally to golf equipment and more particularly concerns a golf shot range finder.

In selecting a club for any given golf shot, the golfer visually estimates the distance from the golf ball to the target golf hole, identifies the particular club personally suited to the golfer for that distance under base conditions and then adjusts from the base club to the actual club selected according to increments of wind, slope, elevation and the like. Without proper base club identification, it is impossible to consistently achieve proper actual club selection.

U.S. Pat. No. 3,409,987 teaches a range finder which correlates the perceived height of a pin in the target golf hole to the yardage of the golf shot by use of a transparent window mathematically calibrated to a 7'-6" high flag stick. The golfer must adjust for courses having flag sticks which are not 7'-6" high by changing the distance at which the window is held from the golfer's eye when the yardage is determined. This introduces further opportunity for error in every use because the golfer may not remember variation used or may not be consistent in positioning the range finder. In addition to the possibility of actual error, this variation leaves a question of confidence in the club selected and lack of confidence in the shot is a major cause of poor shots. Furthermore, the markings on the window, those intended and those resulting from scratches and dirt, confuse and obscure the registration of the pin and therefore the accuracy of the device. The '987 patent also teaches the use of removable adhesive dots or strips to directly correlate the perceived yardage to the golfer's base club selection. This is generally inadequate because, after a modest number of repositionings of the discs or strips, they will no longer satisfactorily adhere to the card. Furthermore, the adhesive of the discs or strips rapidly deteriorates in contact with rain or perspiration and they quickly become useless. From round to round, and even in the course of a round of golf, the timing and strength of the golfer may change, making it desirable to adjust the base club selections accordingly. An on-course change of the adhesive discs or strips is not practical under the best of conditions, it being increasingly likely with each change that the adhesive quality will be lost while on the course.

It is, therefore, an object of this invention to provide a range finder which is usable by a golfer standing at a golf ball to reasonably accurately nomographically determine the yardage from the golf ball to a target golf hole. Another object of this invention is to provide a range finder which nomographically correlates the distance between a golf ball and a target golf hole to the known height of a pin placed in the target golf hole. Still another object of this invention is to provide a range finder having a nomographically defined opening so as to avoid errors or confusion caused by markings or dirt in the in registration area of the range finder. A further object of this invention is to provide a range finder which can be used to nomographically correlate the yardage of a golf shot to either of two different golf pin heights. Yet another object of this invention is to provide a range finder which directly nomographically converts the perceived height of a pin placed in a target golf hole into a club selection. It is also an object of this invention to provide a range finder which permits the golfer to convert yardage indicia into indicia of the golfer's personal club selections for various distances under base conditions.

SUMMARY OF THE INVENTION

In accordance with the invention, a device is provided for assisting a golfer to determine the yardage from a golf ball to a target golf hole and thus to select the proper base club for the golf shot. A flat card has an aperture with elongated top and bottom edges. The top edge is spaced from the bottom edge at parallel intervals taken across the edges by distances decreasing in length from one end of the aperture to the other. The front face of the card has a first plurality of the parallel intervals marked along the edges of the aperture and the back face of the card has a second plurality of the parallel intervals marked along the edges of the aperture. The distances across the aperture at the marked intervals are nomographically coordinated to intervals of distance from the golf ball to the pin placed in the target golf hole. The distance from the golf ball to the pin is thus determinable by coincidental alignment of one of the marked intervals with the pin when the pin is visually registered in the aperture by the golfer. To accomplish this, the golfer stands at the golf ball with the card held at a reading distance of approximately two feet from the golfer's eyes. When the pin is fully registered between the top and bottom edges of the aperture, the golfer merely reads the yardage displayed on the card for the aligned marked interval. Preferably, the pluralities of parallel intervals are equally spaced and have lengths nomographically corresponding to sequential ten yard increments of the distance from the golf ball to the pin. If registration occurs between marked intervals, the golfer can easily interpolate between the marked intervals on either side of the registered pin. The front and rear face markings each nomographically correspond to a different pin length, such as frequently used flag sticks 7'-6" and 6'-6", so as to accommodate a greater number of golf courses.

To facilitate reading the nomographically marked yardages, a plate is mounted in sliding juxtaposition on the front face of the card. Preferably, a narrow, elongated slot is provided through the card with a parallel groove in the front face of the card. A guide fixed on the plate engages with the groove and a bolt extends through a hole in the plate and the narrow, elongated slot to a nut threaded on its end. The bolt and the guide cooperate to maintain the orientation of the plate as it slides on the front face of the card. The bolt and nut cooperate when loosened to permit the plate to slide on the card and when tightened to clamp the plate and the card together. The front face of the card has a first graduated scale corresponding to the first plurality of equally spaced marked intervals indicating yardage on the front face of a card. The plate has a second graduated scale with spaced intervals equal to the first scale. The plate scale indicates club identifications. The golfer slides the plate on the face of the card to correlate the yardage indications shown on the card to the club selection indications on the plate personally appropriate to the particular golfer. The plate is then clamped in this position. Thus, the scales directly nomographically correlate the determined distance from the golf ball to the pin to the base club selection personally appropriate to the particular golfer using the card.

It is preferred, but not necessary, that the bottom edge of the aperture be straight. If a straight bottom edge is used and the narrow elongated slot is aligned parallel to the bottom edge of the aperture with the scale on the front face of the card aligned with the front face interval markings, the golfer can select the appropriate base club without any need for intermediately observing the determined yardage and then transferring to another scale for appropriate club selection. It is further preferred that a second plate be mounted for sliding juxtaposition on the back face of the card. The nomographic method above described can thus be used to also directly correlate the back face yardages to the personalized club selection for the golfer. The golfer need only determine the length of the pins used at the golf course and position the respective front or back plate accordingly.

BRIEF DESCRIPTION OF THE DRAWINGS

Other objects and advantages of the invention will become apparent upon reading the following detailed description and upon reference to the drawings in which:

FIG. 1 is a top plan view of one embodiment of the range finder;

FIG. 2 is a front elevation view of the range finder of FIG. 1;

Figure 3:
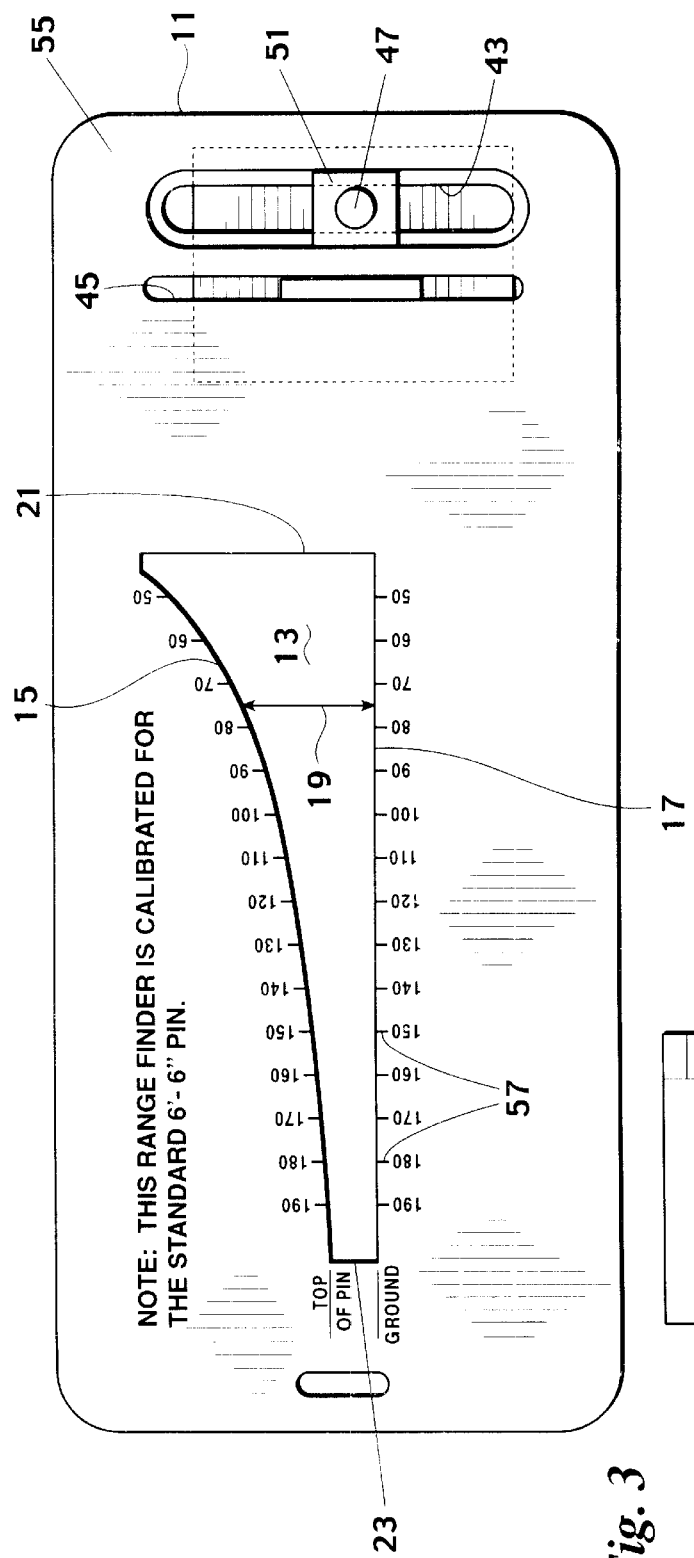
FIG. 3 is a bottom plan view of the range finder of FIG. 1.
Figure 5:
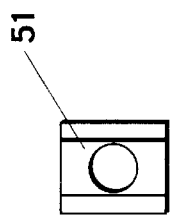
FIG. 5 is a top plan view of the adjustment mechanism of the conversion plate of FIG. 4.
Figure 4:
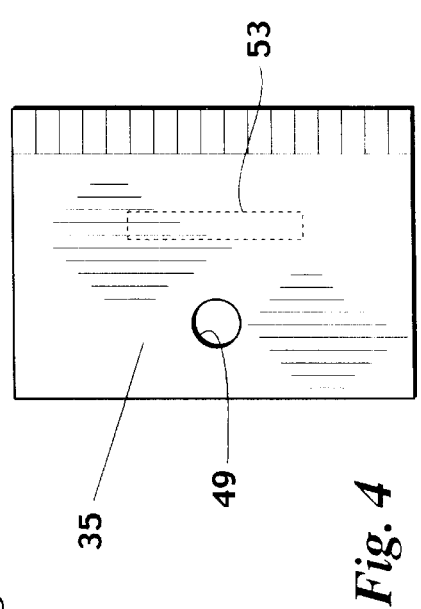
FIG. 4 is a top plan view of the yardage to club selection conversion plate of the range finder of FIG. 1.

While the invention will be described in connection with preferred embodiments, it will be understood that it is not intended to limit the invention to those embodiments. On the contrary, it is intended to cover all alternatives, modifications and equivalents as may be included within the spirit and scope of the invention as defined by the appended claims.

DETAILED DESCRIPTION

Looking at FIG. 1–5, a first embodiment of the golf shot range finder is illustrated. The range finger consists of a flat card 11 with an elongated aperture 13 through it. The aperture 13 has a top edge 15 and a bottom edge 17 which are spaced apart by distances 19 decreasing in length from one end 21 of the aperture 13 to the other end 23 of the aperture 13. The front face 25 of the card 11, as shown in FIG. 1, has an aperture decreasing in size from left to right. The edges 15 and 17 of the aperture 13 are traversely marked in a first plurality of parallel intervals 27. The aperture 13 is configured to nomographically coordinate the distance 19 across the aperture 13 at any given interval 27 with a corresponding distance from the golf ball to a pin or flag stick 31 in a target golf hole. The first plurality of parallel intervals 27 are preferably marked so that the nomograph corresponds to a flag stick or pin 7'-6" in height. Each interval 27 is marked with the appropriate corresponding distance 29 in yards from the golf ball to the pin.

In use, the golfer stands at the golf ball to be played and faces the pin 31 placed in the target golf hole. The card 11 is held at a predetermined distance, such as a typical arm's length of 2'-0" from the eye of the golfer toward the target golf hole. The card 11 is then shifted, while maintaining this distance from the golfer's eye, up and down and right and left until the pin 31 placed in the target golf hole is fully registered between the top and bottom edges 15 and 17 of the aperture 13. As shown in FIG. 1, the pin 31 is fully registered when the top of the pin 31 coincides with the top edge 15 of the aperture 13 and the ground at the bottom of the pin 31 coincides with the bottom edge 17 of the aperture 13. As shown in FIG. 1, this occurs when a 7'-6" pin 31 is aligned between the intervals 27 marked as 100 and 110 yards. With the card 11 held at the specified distance from the golfer's eye and the pin 31 registered between the top and bottom edges 15 and 17 of the aperture 13 as shown, the golfer is able to interpolate that the distance from the golf ball to the pin is 105 yards.

Also located on the front face 25 of the card 11 is a yardage scale 33, preferably divided into equal ten yard intervals. A flat plate 35 is disposed in sliding relationship on the front face 25 of the card 11. The front face of the plate 25 is divided into a scale 37 at intervals equal to the intervals of the scale 33 on the card 11. The card scale 33 is marked in yardage increments 39, also preferably in ten yard intervals. The plate scale 37 is marked with club identification increments 41, each numbered club typically providing a ten yard increase or decrease in yardage in comparison to the next consecutive numbered club. To properly align the plate 35 so that the plate scale 37 can slide in registration with the card scale 33, an elongated slot 43 through the card 11 extends parallel to an elongated groove 45 in the front face 25 of the card 11. As can best be seen in FIGS. 2, 4 and 5, a bolt 47 extends through a hole 49 in the plate 35 to a nut 51 threaded on the end of the bolt 47. A tongue or guide 53 fixed to the back side of the plate 35 engages in the groove 45. Thus, when the bolt 47 is loosened, the plate 35 is free to slide on the front face 25 of the card 11 in a straight path guided by the engagement of the bolt 47 and the tongue 53 in the slot 43 and groove 45, respectively. Thus, the golfer can calibrate the yardage distances 39 on the front face 25 of the card 11 to the personal base club selection 37 suited to the golfer on the front face of the plate 35. To do this, the golfer typically selects an intermediate club which the golfer consistently strikes a known distance and positions the plate 35 to align that numbered club with the anticipated distance. For example, looking at FIG. 1, a golfer who knows that under normal conditions a six iron will produce a 150 yard shot, aligns the six iron marking 41 on the plate 35 with the 150 yard marking 39 on the card 11. The scales 33 and 37 then automatically coordinate the other clubs 37 with their appropriate yardage distances 39. With the plate 35 so positioned, the golfer tightens the bolt 47 to lock the plate 35 in place. This establishes the base club a golfer would use under normal conditions for shots of a given distance. The actual club use for the shot may vary from the base club depending on the golfer's preference for allowance for increments of wind velocity, slope, elevation and the like. If, at any time, the golfer recognizes that the normal distance for his base calibrating club has changed, the bolt 47 can be loosened and the plate 35 adjusted to compensate for the change. No other modification is necessary. In use, when the golfer has registered the flag stick 31 and the aperture 13 and determined the distance in yards 29, the golfer need only read the identification of the club 37 associated with that distance on the scale 37 to determine the appropriate base club for the shot.

Looking at FIG. 3, on the back face 55 of the card 11, the distance 19 across the aperture 13 decreases from right to left. A second plurality of parallel intervals 57 is nomographically coordinated for a pin or flag stick height different than that of the pin or flag stick height used for the first plurality of parallel intervals 27. As shown, the back face 55 of the card 11 has been calibrated to correspond to a 6'-6" pin or flag stick. Thus, the same card 11 can be used for flag sticks of two different lengths. Regardless of whether the yardage is determined using the front or back face 25 or 55 of the card 11, the determined yardage can be read on the front face scale 33 to determine the appropriate base club 41.

Figure 6:
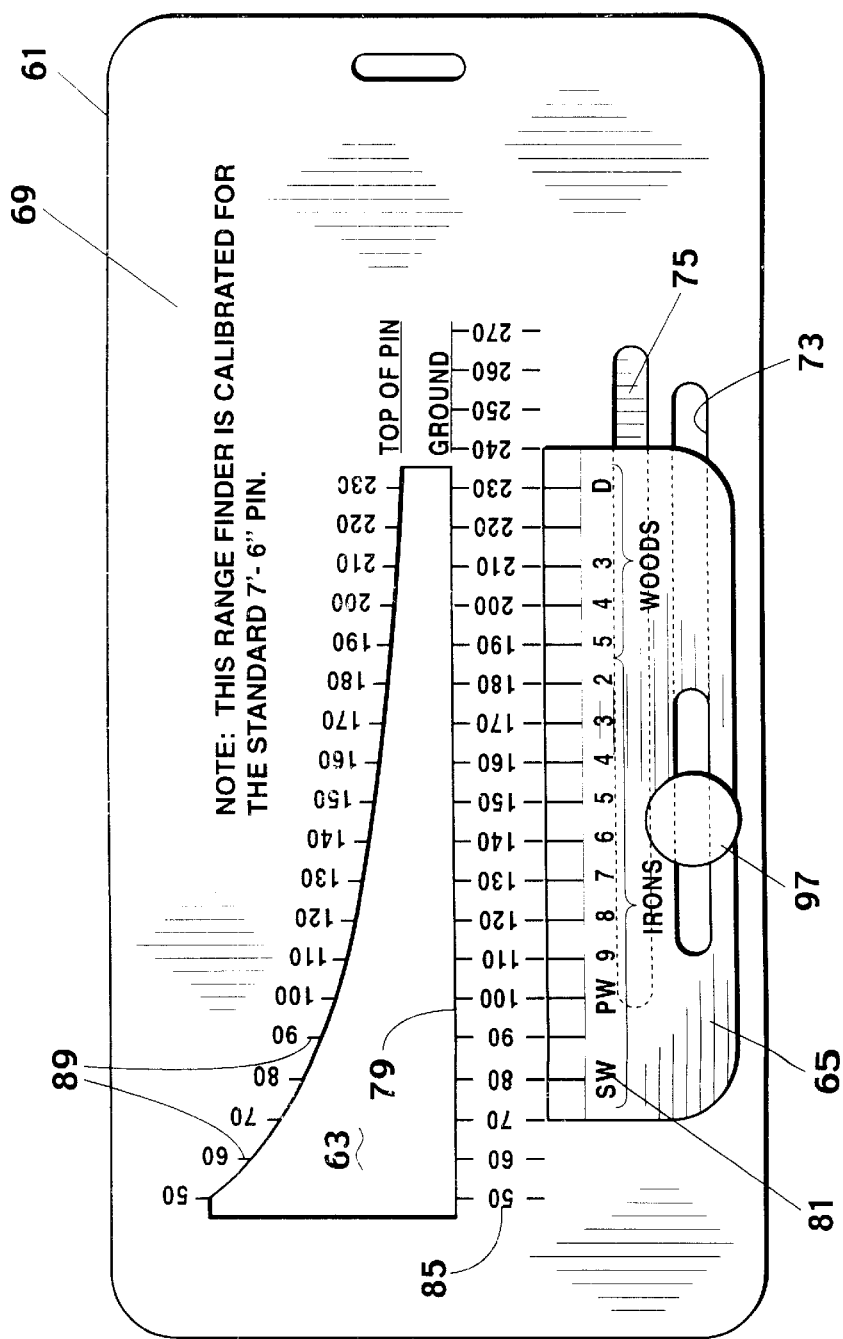
FIG. 6 is a top plan view of another embodiment of the range finder.
Figure 8:
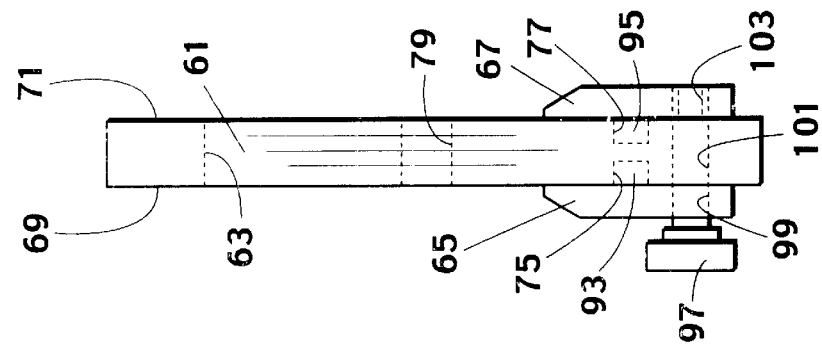
FIG. 8 is an end view of the range finder of FIG. 6.
Figure 7:
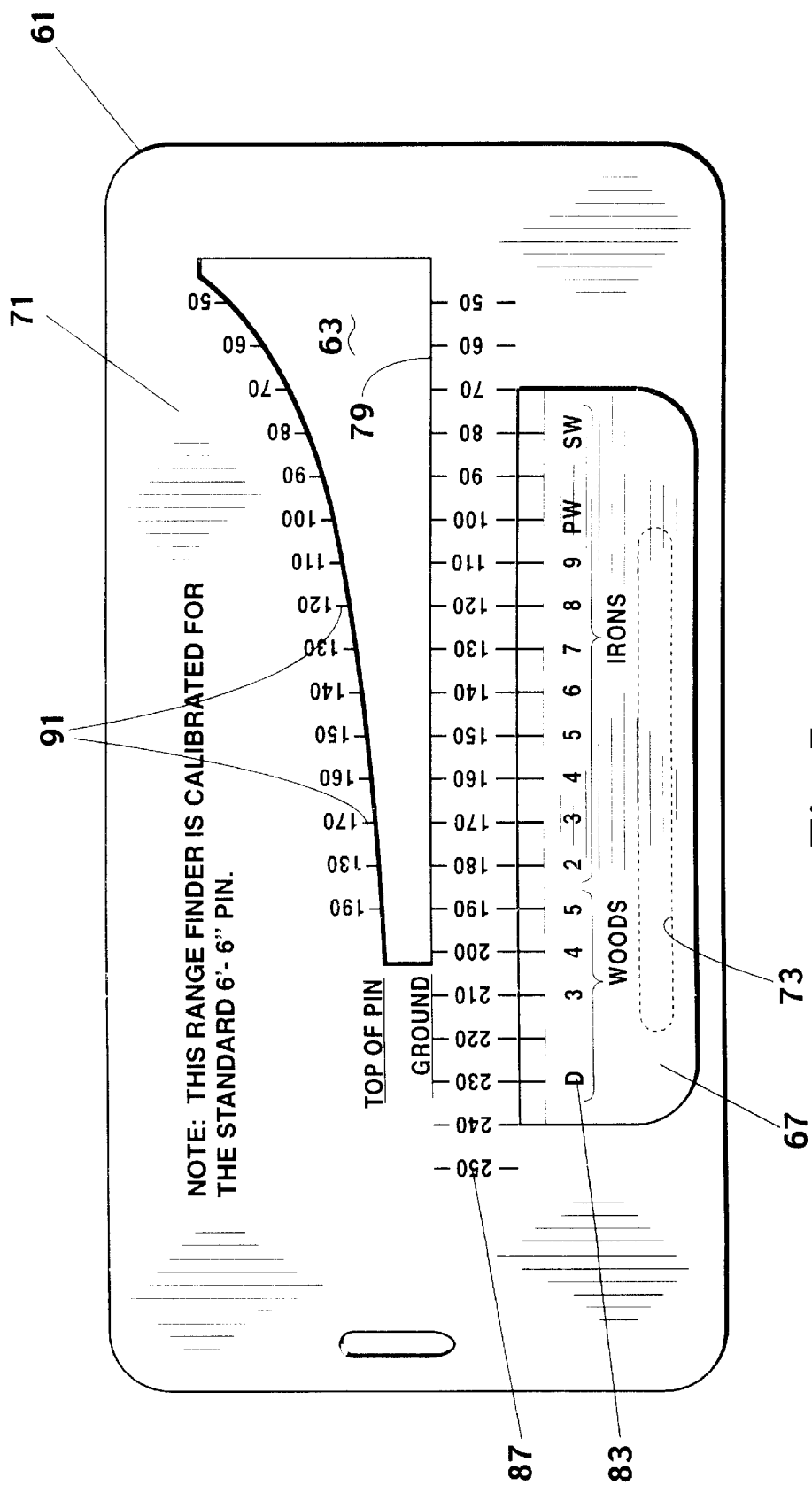
FIG. 7 is a bottom plan view of the range finder of FIG. 6.

Turning to FIGS. 6–8, a specially preferred embodiment of the golf shot range finder is illustrated. As shown in FIGS.

6–8, the card 61 is in all respects similar to the card 11 in relation to the configuration of the elongated aperture 63. That is, the elongated apertures 13 and 63 are substantially the same. However, a pair of plates 65 and 67 are disposed for sliding motion on the front and back faces 69 and 71 of the card 61. An elongated slot 73 through the card 61 extends parallel to elongated grooves 75 and 77 in the front and back faces 69 and 71 of the card 61, respectively. The slot 73 and grooves 75 and 77 are parallel to the bottom edge 79 of the aperture 63. Thus, the club scale 81 or 83 on the front and back plates 65 and 67, respectively, can be aligned directly with the yardage intervals 85 and 87, respectively, on the front and back faces 69 and 71 of the card 61. With this specially preferred embodiment, the golfer can directly determine the base club 81 for a given shot without going through the process of reading the distance and converting the distance to the club selection. Furthermore, the club scale 83 associated on the back plate 67 corresponds directly to the yardage increments 89 on the back face 71 of the card 61 so that, when the back face 71 of the card 61 is being used, the golfer does not have to reverse the card 61 to convert the yardage to the base club selection 83. As can best be seen in FIG. 8, each of the plates 65 and 67 is provided with a tongue 93 or 95, respectively, which engage in the grooves 75 and 77, respectively. A bolt 97 extends through a hole 99 in the front plate 65 and a hole 101 in the card 61 to calibrate the club selection to the golfer's personal abilities and is threaded into a hole 103 in the back plate 67. Thus, with the bolt 97 in a loosened condition, the golfer can slide the plates 65 and 67 to their appropriate position on the card 61 and, once properly positioned, can clamp them in place by tightening the bolt 97.

It is anticipated that a card 11 or 61 will be approximately 3" by 5 ¾" and ¼" thick. The dimensions of the card 11 or 61, however, are a matter of convenience and cost and are not related to the inventive features of the device. Preferably, the card 11 or 61 will be made of substantially rigid though not brittle plastic, though other materials such as metal or wood may be suitable.

Thus, it is apparent that there has been provided, in accordance with the invention, a golf shot range finder that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A device for assisting a golfer to determine the distance from a golf ball to a pin of one of two known lengths extending upwardly from a target golf hole comprising a flat card having front and back faces and an elongated aperture therethrough, said aperture; having a bottom edge and a top edge spaced at parallel intervals taken across said edges by distances decreasing in length from one end to an opposite end of said aperture said distances being nomographically correlated to a range of distances from the golf ball to the pin, said front face having a first plurality of said parallel intervals marked thereon and said rear face having a second plurality of said parallel intervals marked thereon, the distance from the golf ball to the pin being determined by alignment of one of said marked aperture intervals approximately coincidentally with the pin when the pin is visually registered in said aperture by the golfer standing at the golf ball with said card held at approximately an arm's length of the golfer, said front and rear face marked intervals corresponding to one of the two known pin lengths, respectively, and a plate slidably engaged on said card and having indicia thereon for correlating said nomographically determined distances from the golf ball to the pin into base club selections appropriate to the golfer.

2. A device according to claim 1, said first parallel intervals being equally spaced.

3. A device according to claim 2, said first plurality of said parallel intervals having lengths sequentially nomographically corresponding to sequential ten yard increments of the distance from the golf ball to the pin.

4. A device according to claim 3, said second plurality of said parallel intervals being equally spaced.

5. A device according to claim 4, said second plurality of said parallel intervals having lengths sequentially nomographically corresponding to sequential ten yard increments of the distance from the golf ball to the pin.

6. A device for assisting a golfer to determine the distance from a golf ball to a pin of one of two known lengths extending upwardly from a target golf hole comprising a flat card having front and back faces and an elongated aperture therethrough, said aperture having a bottom edge and a top edge spaced at parallel intervals taken across said edges by distances decreasing in length from one end to an opposite end of said aperture, said distances being nomographically correlated to a range of distances from the golf ball to the pin, said front face having a first plurality of said parallel intervals marked thereon and said back face having a second plurality of said parallel intervals marked thereon, the distance from the golf ball to the pin being determined by alignment of one of said marked aperture intervals approximately coincidentally with the pin when the pin is visually registered in said aperture by the golfer standing at the golf ball with said card held at approximately an arm's length of the golfer, said front and back face marked intervals corresponding to one of the two known pin lengths, respectively, and said card having a plate, a narrow, elongated slot through said card and means engaged in said slot for guiding said plate in sliding juxtaposition on said front face of said card and for fixing said plate at a selected position in relation to said card, said plate having a scale along an edge thereof registrable with a scale on said front face of said card correlated to said first plurality of marked intervals, said plate scale having club selection indicia thereon for correlating said nomographically determined distances from the golf ball to the pin into base club selections appropriate to the golfer.

7. A device according to claim 6, said narrow, elongated slot being parallel to said bottom edge of said aperture and said card scale being aligned with said front face marked intervals.

8. A device according to claim 6, further comprising a groove in said front face of said card parallel to said narrow, elongated aperture and a guide extending from said plate into said groove.

9. A device according to claim 6, said guiding and fixing means comprising a bolt extending through a hole in said plate and said narrow, elongated aperture and a nut, said bolt and said nut being cooperate when loosened to permit said plate to slide on said card and when tightened to clamp said plate and said card together.

10. A device according to claim 6 further comprising a second plate, said guiding means also for guiding said second plate in sliding juxtaposition on said back face of said card, and said fixing means also for fixing said back plate at a selected position in relation to said card, said back plate having a scale along an edge thereof registrable with a scale on said back face of said card correlated to said second plurality of marked intervals, said back plate scale having base club selection indicia thereon for correlating said nomographically determined distance from the golf ball to the pin into base club selections appropriate to the golfer.

11. A device for assisting a golfer to determine the distance from a golf ball to a pin of one of two known lengths extending upwardly from a target golf hole comprising a flat card having front and back faces and an elongated aperture therethrough, said aperture having a straight bottom edge and a top edge spaced from said bottom edge at parallel intervals taken across said edges by distances decreasing in length from one end to an opposite end of said aperture, said distances being nomographically correlated to a range of distances from the golf ball to the pin, said front face having a first plurality of said parallel intervals marked thereon and said back face having a second plurality of said parallel intervals marked thereon, the distance from the golf ball to the pin being determined by alignment of one of said marked aperture intervals approximately coincidentally with the pin when the pin is visually registered in said aperture by the golfer standing at the golf ball with said card held at approximately an arm's length from an eye of the golfer, said front and back face marked intervals corresponding to one of the two known pin lengths, respectively, a plate, a narrow, elongated slot through said card, means engaged in said slot for guiding said plate in sliding juxtaposition on said front face of said card and for fixing said plate at a selected position in relation to said card, said plate having a scale along an edge thereof registrable with a scale on said front face of said card, said scales having indicia correlating said nomographically determined distances from the golf ball to a pin of one length into base club selections appropriate to the golfer.

12. A device according to claim 11, said narrow, elongated slot being parallel to said bottom edge of said aperture and said scale on said front face of said card being said front face marked intervals.

13. A device according to claim 11 further comprising a groove in said front face of said card parallel to said narrow, elongated aperture and a guide extending from said plate into said groove.

14. A device according to claim 11, said guiding and fixing means comprising a bolt extending through a hole in said plate and said narrow, elongated aperture and a nut, said bolt and said nut being cooperate when loosened to permit said plate to slide on said card and when tightened to clamp said plate and said card together.

15. A device according to claim 11 further comprising a second plate, said guiding and fixing means further being for guiding said second plate in sliding juxtaposition on said back face of said card and for fixing said second plate at a selected position in relation to said card, said second plate having a scale along an edge thereof registrable with a scale on said back face of said card, said second plate and said back face scales having indicia correlating said nomographically determined distances from the golf ball to a pin of the other length into base club selections appropriate to the golfer.

16. A device according to claim 15, said narrow, elongated slot being parallel to said bottom edge of said aperture and said scales on said front and back faces of said card being said first and second plurality of marked intervals, respectively.

17. A device for assisting a golfer to determine the distance from a golf ball to a pin extending upwardly from a target golf hole comprising a flat card having a front face and an elongated aperture therethrough, said aperture having a bottom edge and a top edge spaced at parallel intervals taken across said edges by distances decreasing in length from one end to an opposite end of said aperture, said distances being nomographically correlated to a range of distances from, the golf ball to the pin, said front face having a plurality of said parallel intervals marked thereon, the distance from the golf ball to the pin being determined by alignment of one of said marked aperture intervals approximately coincidentally with the pin when the pin is visually registered in said aperture by the golfer standing at the golf ball with said card held at approximately an arm's length of the golfer, said card having a plates a narrow, elongated slot through said card and means engaged in said slot for guiding said plate in sliding juxtaposition on said front face of said card and for fixing said plate at a selected position in relation to said card, said plate having a scale along an edge thereof registrable with a scale on said front face of said card correlated to said first plurality of marked intervals, said plate scale having club selection indicia thereon for correlating said nomographically determined distances from the golf ball to the pin into base club selections appropriate to the golfer.

18. A device according to claim 17, said narrow, elongated slot being parallel to said bottom edge of said aperture and said card scale being aligned with said front face marked intervals.

* * * * *